(12) United States Patent
Figotin et al.

(10) Patent No.: US 6,701,048 B2
(45) Date of Patent: Mar. 2, 2004

(54) UNIDIRECTIONAL GYROTROPIC PHOTONIC CRYSTAL AND APPLICATIONS FOR THE SAME

(75) Inventors: Alexander Figotin, Irvine, CA (US); Ilya Vitebskiy, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 101 days.

(21) Appl. No.: 10/127,649

(22) Filed: Apr. 22, 2002

(65) Prior Publication Data

US 2002/0162988 A1 Nov. 7, 2002

Related U.S. Application Data

(60) Provisional application No. 60/288,154, filed on May 1, 2001.

(51) Int. Cl.[7] .................................................. G02B 6/00
(52) U.S. Cl. ........................ 385/122; 385/129; 385/130; 385/131; 385/141
(58) Field of Search ........................ 385/14, 122, 129, 385/130, 131, 132, 141

(56) References Cited

U.S. PATENT DOCUMENTS

| | | | | |
|---|---|---|---|---|
| 5,867,300 A | * | 2/1999 | Onaka et al. | 359/283 |
| 5,990,850 A | * | 11/1999 | Brown et al. | 343/912 |
| 6,261,469 B1 | * | 7/2001 | Zakhidov et al. | 216/56 |
| 6,433,931 B1 | * | 8/2002 | Fink et al. | 359/586 |
| 6,532,326 B1 | * | 3/2003 | Hutchinson et al. | 385/37 |
| 6,597,721 B1 | * | 7/2003 | Hutchinson et al. | 372/98 |
| 6,597,851 B2 | * | 7/2003 | Johnson et al. | 385/131 |
| 2002/0041749 A1 | * | 4/2002 | Johnson et al. | 385/129 |
| 2002/0074537 A1 | * | 6/2002 | John et al. | 252/584 |
| 2002/0135880 A1 | * | 9/2002 | Fink et al. | 359/586 |
| 2003/0039446 A1 | * | 2/2003 | Hutchinson et al. | 385/39 |
| 2003/0142719 A1 | * | 7/2003 | Fan | 372/108 |

* cited by examiner

*Primary Examiner*—Brian Healy
(74) *Attorney, Agent, or Firm*—Daniel L. Dawes; Myers Dawes Andras & Sherman LLP

(57) ABSTRACT

An unidirectional gyrotropic photonic crystal allows electromagnetic wave propagation in a certain direction at a certain frequency and, at the same time, impedes electromagnetic wave propagation in the opposite direction. The electromagnetic wave with impeded propagation, called the "frozen mode", ideally has zero group velocity and does not transfer the electromagnetic energy. A unidirectional gyrotropic photonic crystal is a periodic composite, incorporating a component displaying Faraday rotation. The property of unidirectionality can be achieved in gyrotropic photonic crystals by proper choices of constituents and their space arrangement. The invention can be used to enhance the capability and performance of microwave, millimeter wave, and submillimeter wave antennas, delay lines, nonlinear and nonreciprocal elements. It can also be used in integrated microwave circuitry.

43 Claims, 11 Drawing Sheets

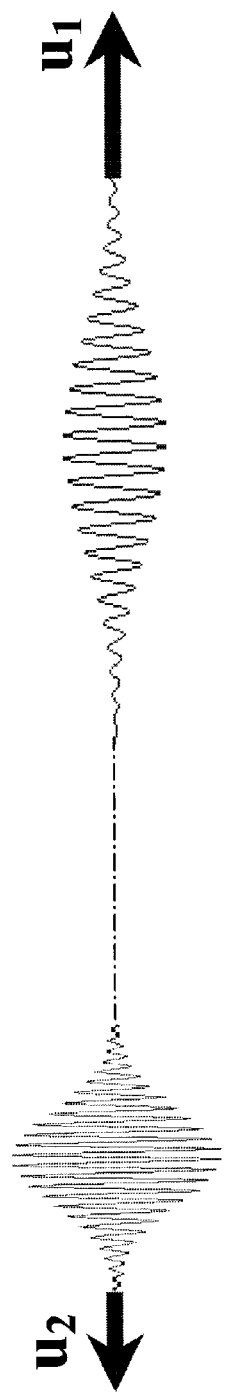
FIG. 4A
FIG. 4B

UNIDIRECTIONAL GYROTROPIC PHOTONIC CRYSTAL AND APPLICATIONS FOR THE SAME

RELATED APPLICATIONS

The present application is related to U.S. Provisional Patent Application, Serial No. 60/288,154, filed on May 1, 2001, priority to which is claimed pursuant to 35 USC 120 and which is incorporated herein.

The invention was made with support under U.S. government contract F49620-99-0203 from AFOSR. The U.S. government has certain rights to the invention.

BACKGROUND OF THE INVENTION

1. Field of the Invention

The invention relates to the field of photonic crystals and their applications in optics and microwave technology. More specifically, the invention relates to nonreciprocal magnetic photonic crystals, including magnetic multilayered structures, with magnetic constituent being a gyrotropic material with appreciable Faraday rotation.

2. Description of the Prior Art

Photonic crystals comprise various spatially periodic structures composed of the constituents each of which is practically lossless for electromagnetic radiation in the frequency range of interest. As a consequence of spatial periodicity, the electromagnetic frequency spectrum of photonic crystals develops a band-gap structure similar to that of electrons in semiconductors and metals. The existence of forbidden frequency gaps (stop-bands) in the electromagnetic spectrum forms the basis for the majority of photonic crystals applications in optics and microwave technology. Additional practically important feature of photonic crystals that has been utilized in a number of optical and microwave solid-state devices is the possibility to engineer photonic crystals with prescribed dispersion. This feature allows to control the direction and speed of electromagnetic wave propagation through composite media.

Another category of optical and microwave solid-state devices that can be seen as a prior art to the present invention, comprises various nonreciprocal devices and circuit elements. Some examples are presented by microwave and optical isolators, gyrators, rotators, nonreciprocal phase shifters, etc. Nonreciprocal solid-sate devices based on the effect of Faraday rotation in magnetic media are widely used in microwave and optics.

Nonreciprocal Magnetic Photonic Crystals

In gyrotropic photonic crystals, wave propagation can display additional features, utilization of which forms the basis of the present invention. In particular, in gyrotropic photonic crystals, electromagnetic waves propagating in two opposite directions may display strong asymmetry $$\omega(k) \neq \omega(-k), \qquad (1)$$

as shown in FIG. 2.

The present invention utilizes the strong spectral asymmetry (1) of the bulk electromagnetic waves in gyrotropic photonic crystals. Unlike the case of surface electromagnetic waves, the spectral asymmetry of the bulk waves is prohibited by symmetry in all nonmagnetic and most magnetic photonic crystals. The strong spectral asymmetry though of the bulk waves has been shown to exist in gyrotropic photonic crystals with some special space arrangement of the constituents (A. Figotin and I. Vitebskiy, Phys. Rev. E, 2001). It can be achieved by proper space arrangement of its constitutive components. The spectral asymmetry by no means occurs automatically in any gyrotropic photonic crystal. Quite the opposite, only special periodic arrays of the gyrotropic and other components can produce the effect. For this reason, all magnetic photonic crystals considered in previous art, have perfectly symmetric bulk dispersion relations. The search for periodic arrays yielding strongly asymmetric dispersion relations constitutes an important part of the design.

Strong spectral asymmetry may result in the phenomenon of unidirectional wave propagation, which forms the physical basis of the present invention. Consider a plane wave propagating through a gyrotropic photonic crystal along the Z direction, so that both the wave group velocity $u = \partial\omega/\partial k$ and the wave vector k are parallel to Z. Suppose that the electromagnetic dispersion relation is asymmetric, and that one of the spectral branches $\omega(k)$ develops a stationary inflection point at $k = k_1$ and $\omega = \Omega$ as shown in FIG. 3

At $k = k_1$: $\partial\omega/\partial k = 0$; $\partial^2\omega/\partial k^2 = 0$; and $\partial^3\omega/\partial k^3 \neq 0$ \qquad (2)

There are exactly two bulk electromagnetic modes associated with the frequency $\Omega$, with the corresponding wave numbers being $k_1$ and $k_2$. Observe that only one of the two waves can transfer the energy, namely the one with $k = k_2$ and the group velocity $u(k_2) > 0$. Indeed, the backward wave with $k = k_1$ has zero group velocity $u(k_1) = 0$ and does not propagate through the medium. Because of this property, we call the mode related to $k = k_1$ the frozen mode, while a gyrotropic photonic crystal supporting the frozen mode is referred to as a unidirectional gyrotropic photonic crystal.

At first sight, the unidirectional photonic crystal would act similarly to a common microwave or optical isolator, transmitting radiation of the frequency $\Omega$ only in one of the two opposite directions. But in fact, there is an important difference. An isolator simply eliminates (usually, absorbs or deflects) the wave propagating in the undesired direction, whereas the unidirectional photonic crystal, being transparent for electromagnetic wave propagating in one direction, freezes and accumulates the radiation of the same frequency $\Omega$ propagating in the opposite direction, as shown in FIGS. 10 and 11. This quality is critical for the present invention and its applications.

The fact that not only the group velocity u of the backward wave vanishes at $\omega = \Omega$, but so does its derivative $\partial u/\partial k$, enhances the property of unidirectionality preventing the frozen wave packet from spreading.

The property of unidirectionality only exists for $k \| Z$, $\omega = \Omega$, where Z is the direction of unidirectionality, and $\Omega$ is the frozen mode frequency. This means that for directions of wave propagation different from Z and/or for the wave frequencies different from $\Omega$, the effect of unidirectionality disappears.

The present invention utilizes the property of electromagnetic unidirectionality in several proposed microwave and optical devices.

In summary, we present the list of the basic terms and definitions we refer to when describing the invention.

A gyrotropic photonic crystal:

is a composite periodic array of two or more constituents each of which does not substantially absorb the energy of ac electromagnetic field in the frequency range of interest. At least one of the constituents must display Faraday rotation. The preferred embodiment of gyrotropic photonic crystals is a periodic magnetic stack, examples of which are shown in FIGS. 5 and 7. In real devices, the total number of the elementary fragments constituting photonic crystal may vary within a wide range starting from just a few.

Bulk spectral asymmetry:

is the property of a homogeneous or periodic composite medium to support an asymmetric dispersion relation $\omega(k) \neq \omega(-k)$ as explained in FIG. 2 or 3. When applied to real systems of finite dimensions, the term spectral asymmetry means the spectral asymmetry of the infinite periodic structure built up of the same primitive fragments as the finite one.

A unidirectional photonic crystal:

is a photonic crystal that transmits electromagnetic waves of a certain frequency $\Omega$ propagating in a certain direction Z and, at the same time, it freezes the radiation of the same frequency $\Omega$ propagating in the opposite direction, as shown in FIGS. 3 and 11. The frozen wave (mode) is defined as the one having zero or negligible group velocity U, together with its derivative $\partial u/\partial k$. The frequency $\Omega$ is referred to as the frozen mode frequency. The direction Z is referred to as the direction of unidirectionality.

A unidirectional slab:

is a fragment of a unidirectional photonic crystal bounded by a pair of plane parallel faces, as shown in FIGS. 10 and 11. This device transmits electromagnetic wave packet with k||Z and the frequency $\omega$ close to $\Omega$ only in one of the two opposite directions along the Z axis, this direction is designated with the arrow 2 in FIGS. 10 and 11. The slab faces are perpendicular to the Z-direction associated with the frozen mode, unless otherwise is specifically qualified.

A tunable photonic crystal:

is a photonic crystal the electromagnetic properties of which, including the electromagnetic band structure, can be controllably altered. The tunability can be achieved by applying or changing external dc or quasi-stationary magnetic or electric field, altering the geometry of the periodic array, or by other external means. In the case of a photonic crystal with spectral asymmetry, the tuning may affect the character and even the very existence of the spectral asymmetry.

BRIEF SUMMARY OF THE INVENTION

The invention is defined as a nonreciprocal unidirectional photonic crystal, which is a periodic array comprising a plurality of at least two constitutive components each of which is practically lossless at electromagnetic frequency range of interest. At least one of the constitutive components is a ferromagnet, a ferrite, or it has a magnetization induced by an applied external magnetic field, so that this component displays substantial Faraday rotation at the frequency range of interest. The composition and the geometry of the periodic array are designed so that the array displays the property of bulk spectral asymmetry and, at least at one particular frequency $\Omega$, it also displays the property of electromagnetic unidirectionality.

The invention also comprises an assembly of a unidirectional photonic crystal and some passive or active electromagnetic network elements, for example, a resonator, an antenna or antenna array, a microwave circuitry.

The invention may further comprise a means for providing photonic crystal tunability by controlled altering its electromagnetic characteristics, such as: (i) the frequency $\Omega$ of the frozen mode; (ii) the direction Z of unidirectionality; (iii) the degree of spectral asymmetry, which includes the possibility of blurring or eliminating the property of unidirectionality; (iv) other electromagnetic characteristics. Examples of means for providing the photonic crystal tunability include but are not limited to: (i) a controlled source of a dc or a quasi-stationary magnetic field with alterable strength and/or direction, which allows to control the magnetic permeability tensor of the gyrotropic constituent; (ii) a controlled source of a dc or a quasi-stationary electric field with alterable strength and/or direction which allows to control the electric permittivity tensor of at least one of the dielectric constituents; (iii) a motor or an array of motors for altering position and/or orientation of the constitutive components of the array. In a broader conception, means for providing tunability may include any external controlled physical cause altering magnetic permeability or electric permittivity of the photonic crystal constituents and/or altering any of the geometric characteristics of the array.

In one embodiment, shown in FIG. 5, the unidirectional photonic crystal is a periodic stack of identical three-layered elementary fragments, where each three-layered fragment L comprises one ferromagnetic or ferrimagnetic layer and two anisotropic dielectric layers with misaligned anisotropic axes.

In another embodiment, shown in FIG. 7, the unidirectional photonic crystal is a periodic stack of identical four-layered elementary fragments, where each four-layered fragment L comprises two ferromagnetic or ferrimagnetic layers with opposite directions of magnetization and two anisotropic dielectric layers with misaligned anisotropic axes. This embodiment has zero bulk magnetization and therefore does not produce demagnetization field.

In still another embodiment the anisotropic dielectric layers of the either of the above two embodiments are replaced with misaligned stock-pile layers made of an isotropic dielectric material, as shown in FIG. 9.

The invention is still further defined as a unidirectional composite slab with frequency and directional selectivity comprised of an unidirectional photonic crystal bounded by two plane faces, as shown in FIGS. 10 and 11. Each of the two plane faces is perpendicular to the direction Z of unidirectionality, such that a first wave packet 9 of frequency $\Omega$ and normal incidence impinging on one plane face enters the slab and freely propagates further through the slab in the same direction as shown in FIG. 10, while a second wave packet 10 of the same frequency $\Omega$ and the opposite direction of propagation impinging on the opposite face of the slab 11 gets trapped after entering the slab and its amplitude increases sharply as shown in FIG. 11.

The invention may further comprise the unidirectional slab and a plane mirror parallel to slab faces as shown in FIG. 13. A gap being defined between the mirror and the nearest face of the unidirectional photonic crystal. The mirror is arranged and configured to be sufficiently reflective in a frequency range of interest which includes frequencies in the vicinity of the frozen mode frequency $\Omega$.

In one of the embodiments the gap between the mirror and the face has a size of zero and the unidirectional device is used as a wave packet delay line having a delay time $\tau$, as shown in FIG. 14. The delay time $\tau$ is sensitive to the frequency, $\omega$, and to the direction of propagation of the incident wave packet 9. The delay time $\tau$ is maximal when incoming wave packet 9 has normal incidence and a frequency close to the frozen mode frequency $\Omega$, in such a case the electromagnetic wave packet after being reflected from the mirror 18, very slowly propagates backward through the unidirectional slab 11 until it escapes the system. The delay line may further comprise means for photonic crystal tunability. In this latter case the delay time $\tau$ can be controllably altered within wide limits.

The invention is even still further defined as a unidirectional single mode resonator with directional and frequency selectivity comprised of a unidirectional photonic slab 11 and a mirror 18, as shown in FIG. 15. The incoming radiation 16 of frequency Ω of the frozen mode and normal incidence impinging on one face of the photonic slab 11 is transmitted through the slab until it reaches the mirror 18. After being reflected from the mirror 18, the radiation is converted into the frozen mode and gets trapped at the rightmost portion of the slab 11 where the electromagnetic radiation accumulates until is further processed. The directional and the frequency selectivity of the device is provided by the fact that the resonator only accumulates the energy of incoming radiation with the frequency Ω of the frozen mode and the normal incidence. The incoming electromagnetic radiation of different frequency or with different direction of propagation, is not converted into the frozen mode after being reflected by the mirror 18 and, therefore, escapes the system.

In such an embodiment the unidirectional single mode resonator in FIG. 15 may further comprise other devices utilizing the accumulated energy. For example, it may further comprise a means for processing of electromagnetic radiation disposed in or near the gap between the mirror 18 and the unidirectional slab 11. Examples of processing means are: a receiving antenna or phase sensitive antenna array 20, a nonlinear element or an array of nonlinear elements, other active and passive elements of optical or microwave circuitry.

The unidirectional resonator may further comprise means for tuning to control: (i) the selected direction of the incoming radiation for which the electromagnetic energy gets trapped in the vicinity of the mirror; (ii) the frequency Ω of the frozen mode; or (iii) the level of directional and frequency sensitivity of the device. Examples of tunability means have been specified earlier.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

BRIEF DESCRIPTION OF THE DRAWINGS

FIGS. 1A and 1B are graphs which depict the symmetric dispersion relations corresponding to $\phi_2-\phi_1=0$ and $\phi_2-\phi_1=\pi/2$, respectively. FIGS. 2A and 2B are graphs which depict the asymmetric dispersion relations corresponding to $\phi_2-\phi_1=\pi/4$. In both asymmetric cases, one of the spectral branches develops stationary inflection point 1. The corresponding frequency Ω is associated with the frozen mode and the electromagnetic unidirectionality.

FIGS. 4A and 4B are schematic depictions of wave packets propagating along the Z axis in two opposite directions. FIG. 4A shows the case of a regular dispersive media including regular photonic crystals where $u_2=-u_1$. FIG. 4B shows the case of gyrotropic photonic crystal with spectral asymmetry where $u_1 \neq -u_2$.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The invention comprises the design and utility of a unidirectional photonic slab. The preferred embodiment relates to the frequency range between 1 and 200 GHz. In this case, a unidirectional slab is a periodic array of two kinds of homogeneous layers: (i) layers made of a uniaxial ferromagnet or a ferrite and (ii) layers of anisotropic dielectric material with in-plane anisotropy. The material of each of the layers is practically lossless at the frequency range of interest. The composition and the geometry of the periodic array are designed so that the array displays the property of bulk spectral asymmetry and, at least at one particular frequency Ω, it also displays the property of electromagnetic unidirectionality.

Figure 5:
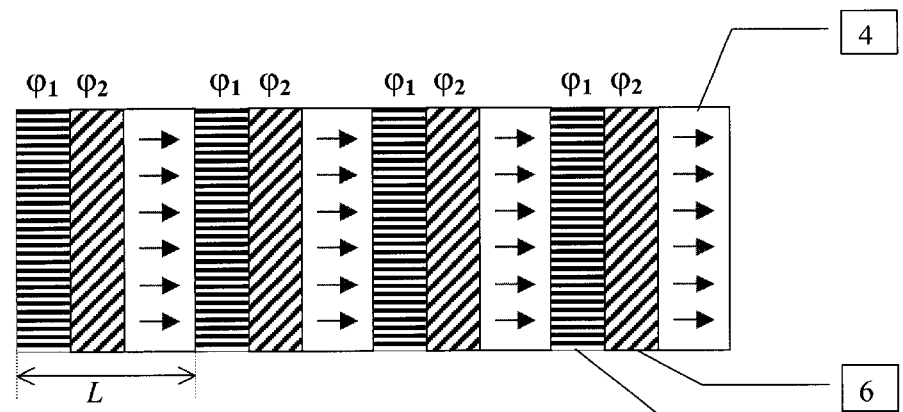
FIGS. 5, 6 and 7 are diagrammatic side cross-sectional depictions of three embodiments of periodic gyromagnetic stacks composed of two different layers: (i) uniaxial ferromagnetic layers 4 with magnetization M perpendicular to the layer of anisotropy within the X-Y plane. L is the length of the elementary fragment of the respective periodic stack. The periodic stacks in FIGS. 5 and 7 support spectral asymmetry, unless $\phi_2-\phi_1=0$ or $\phi_2-=\pi/2$. They represent two preferred embodiments of potentially unidirectional photonic crystals.
Figure 6:
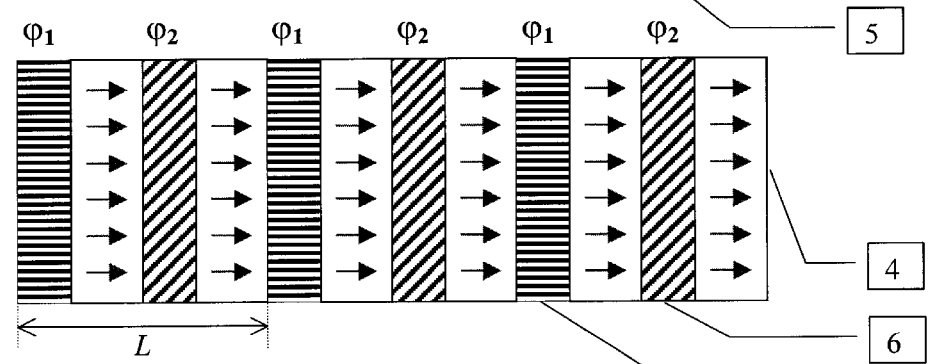

As an example, consider the following arrangement. A cylinder-shaped magnetic periodic stack incorporates some 10–50 identical fragments L each of which, in turn, is a stack of three homogeneous layers, as shown in FIG. 5. The diameter of the stack must be large enough (5–10 wavelengths, or more).

Each of the identical fragments L consists of three uniform layers, including two anisotropic dielectric layers 5 and 6 with different respective orientations $\phi_1$ and $\phi_2$, and one ferromagnetic layer 4 with magnetization parallel to the cylinder axis. The anisotropic dielectric layers 5 and 6 must display at least moderate dielectric anisotropy in the XY plane: 20–30% or more would be enough. The ferromagnetic or ferrimagnetic material of the magnetic layers 4 must display Faraday rotation of at least a few degrees per wavelength, or more. At the microwave, millimeter wave, or submillimeter wave ranges, the appropriate generic ferrite materials are available.

An external uniform dc magnetic field is needed (i) to align magnetizations M of individual magnetic layers and (ii) to provide tunability. Standard precautions should be taken to ensure uniformity of the effective magnetic field inside the magnetic layers.

Figure 7:
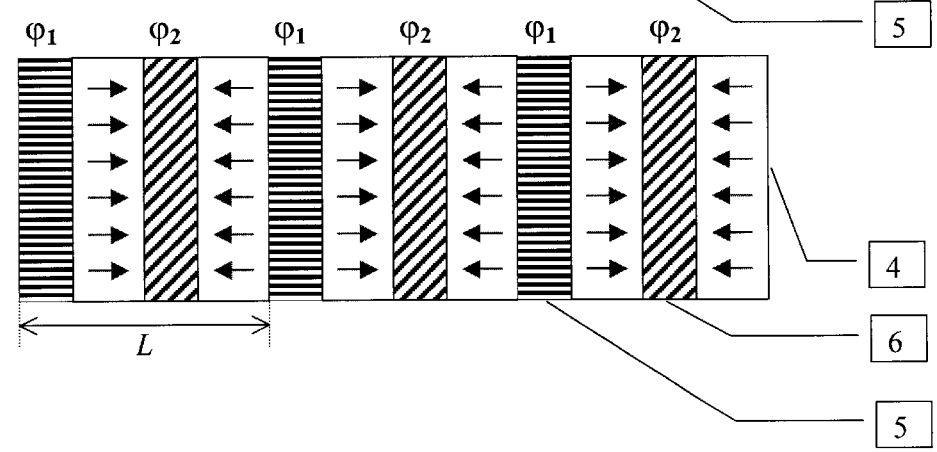
Figures 8A, 8B:
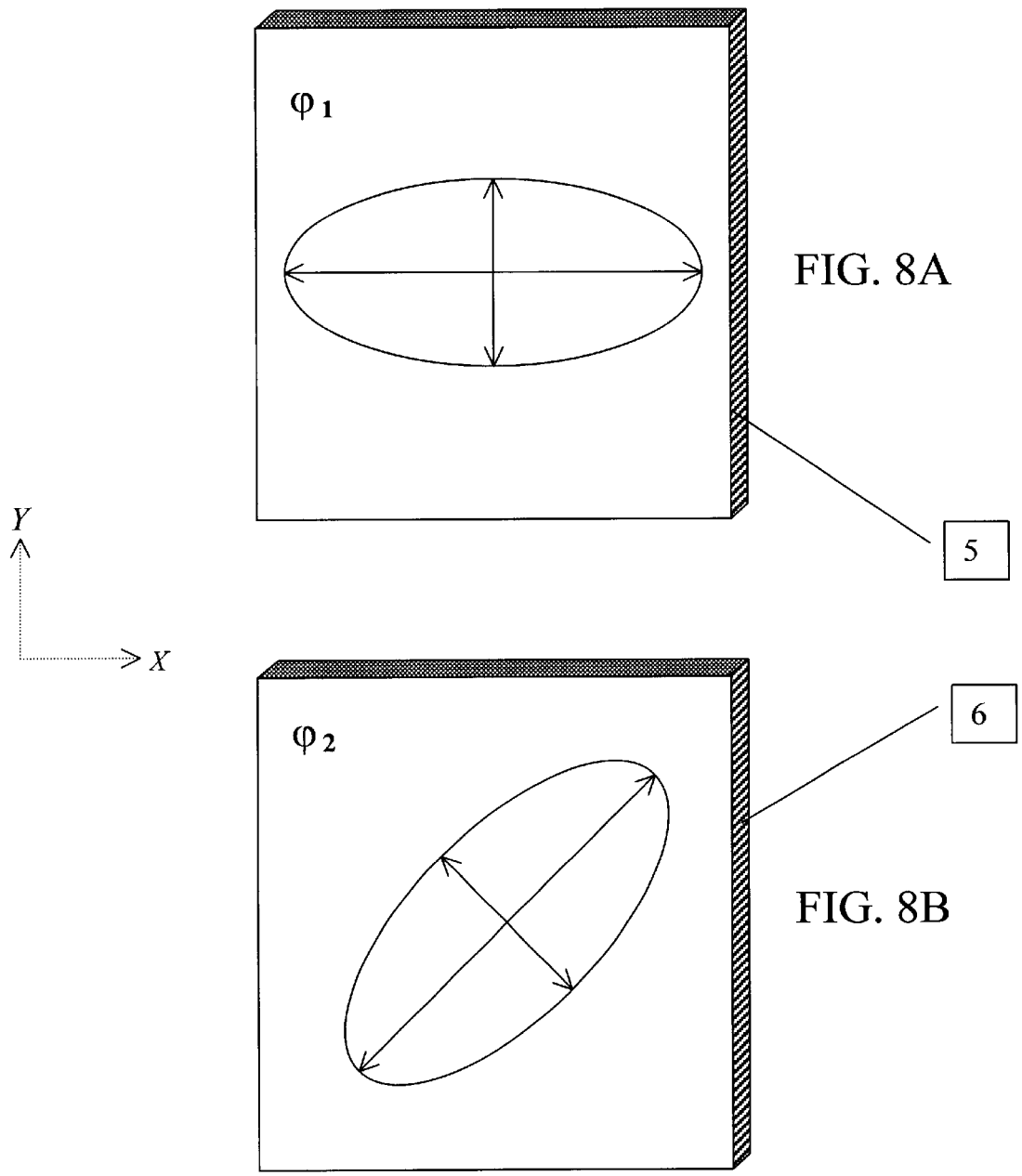
FIGS. 8A and 8B are diagrammatic plan view depictions of the anisotropic dielectric layers 5 and 6 of FIGS. 5–7 showing their respective orientations $\phi_1$ and $\phi_2$ in the X-Y plane. Both layers may have the same thickness and are made of the same anisotropic dielectric material.

An alternative magnetic stack with four layers in each elementary fragment L is shown in FIG. 7. The potential advantage of this array is that the antiparallel orientation of magnetization in neighboring magnetic layers cancels out the bulk magnetization of the stack, and eliminate the potential demagnetization field problem. Ferromagnetic (or ferrimagnetic) material used in the antiparallel arrangement must display sufficient uniaxial anisotropy, because in this latter case, external magnetic field cannot align magnetizations M in individual magnetic layers.

Both periodic stacks in FIGS. 5 and 7 support spectral asymmetry, unless ($\phi_2 - \phi_1 = 0$ or $\phi_2 - \phi_1 = \pi/2$. They represent two preferred embodiments of potentially unidirectional photonic crystals.

Design of unidirectional gyrotropic photonic slab involves two major problems (i) choice of specific constituents with the outlined above properties; (ii) choice of the geometry of periodic array, which includes the layers thicknesses and the misalignment angle $\phi_2 - \phi_1$. The two problems are intimately related and must be solved together.

The second step of the design comprises computations of the spectral characteristics of the gyrotropic photonic crystals selected in the first step. The goal of the design is to find geometric parameters of the periodic composite structure that would yield the property of electromagnetic unidirectionality. The variable geometrical parameters include the thickness of different layers as well as the mutual orientation $\phi_1 - \phi_2$ of the anisotropic layers 5 and 6. The design of the geometric parameters depends also on the chosen material parameters.

Figure 1A:
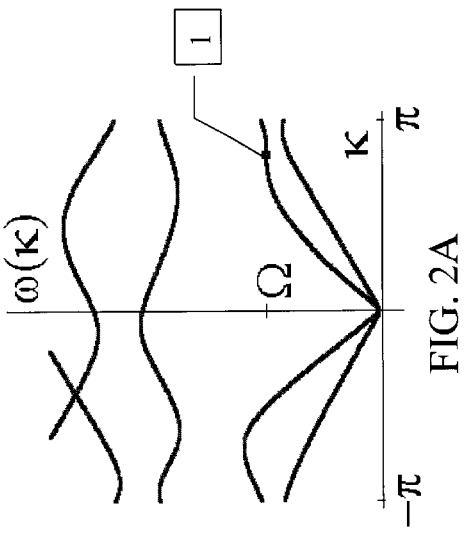
FIGS. 1A and 1B and 2A and 2B depict electromagnetic dispersion relations of four periodic gyrotropic stacks composed of the same set of uniform layers: one ferromagnetic layer 4 in FIG. 5 with magnetization M∥Z, and two anisotropic dielectric layers 5 and 6 with orientations $\phi_1$ and $\phi_2$, respectively, as shown in FIGS. 5 and 8. The mutual arrangement of the layers is presented in FIG. 5.
Figure 2A:
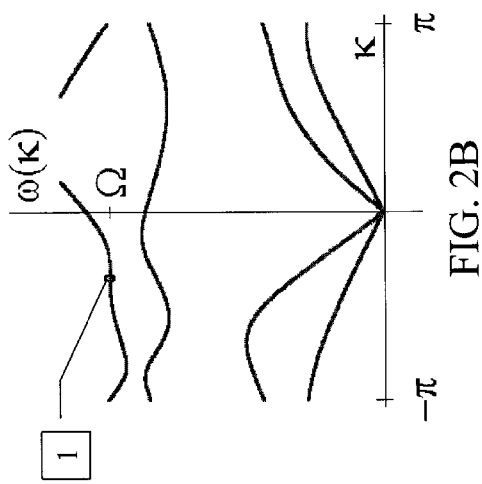
Figure 1B:
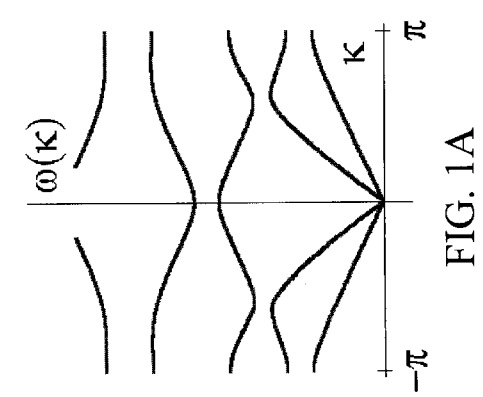
Figure 2B:
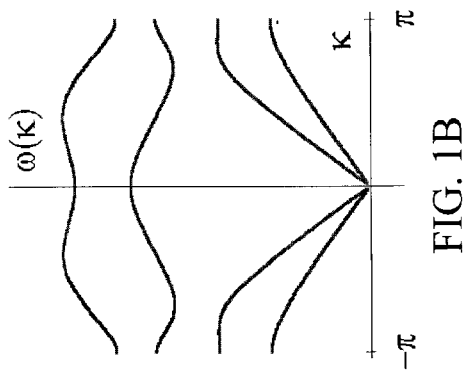
Figure 3:
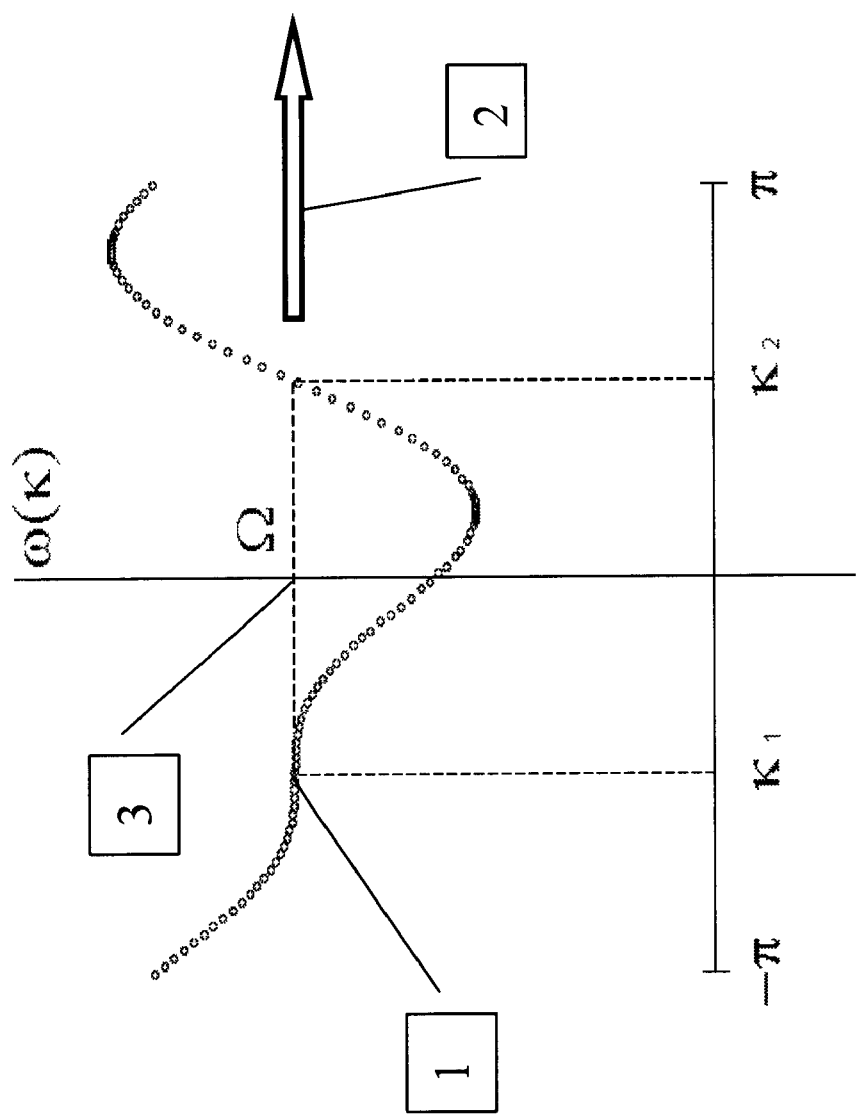
FIG. 3 is a graph of an asymmetric spectral branch with stationary inflection point 1. The frequency Ω is the frozen mode frequency. The arrow 2 shows the allowed direction of electromagnetic wave propagation. The wave propagating in the opposite direction (the frozen mode) does not transfer the energy and, therefore, will be trapped inside the periodic array, as shown in FIG. 11.

Examples of asymmetric dispersion relations computed for the gyrotropic periodic stack shown in FIG. 5 are presented in FIG. 2. The numerical experiments have been carried out based on realistic physical parameters of the dielectric constituents. The results confirm that the properly designed periodic magnetic stacks composed of regular magnetic and anisotropic dielectric components support the property of electromagnetic unidirectionality.

The invention can now be summarized by the following characterizations:

(1). A photonic crystal with strong bulk spectral asymmetry, made up of regular homogeneous constitutive components each of which may have perfectly symmetric dispersion relation. Examples are presented in FIGS. 5 and 7. Such a periodic array is a novel composite material with the property of strong spectral asymmetry that is impossible in homogeneous media. A photonic crystal with strong bulk spectral asymmetry is the key element in all electromagnetic devices included in this invention.

(2). A photonic crystal with the spectral asymmetry made up of homogeneous constitutive components of paragraph (1) and other practically lossless components, which may not be homogeneous. These additional components include, but are not limited to, resonators and other microwave elements and circuits.

(3). A tunable photonic crystal with spectral asymmetry, which is the subject of paragraph (1) or (2) in which the character and/or the very existence of spectral asymmetry can be controlled by (i) external magnetic or electric field, (ii) alterable geometric characteristics of the photonic crystal, (iii) by other external physical causes.

(4) A design of a periodic magnetic stack with spectral asymmetry, each primitive cell of which comprises at least one gyrotropic layer 4 and at least two anisotropic dielectric layers 5 and 6 with misaligned anisotropy axes as shown in examples in FIGS. 5 and 7.

(5) A design of a gyrotropic periodic stack with spectral asymmetry and zero bulk (averaged) magnetization, each primitive cell of which comprises at least two gyrotropic layers 4 with opposite magnetization and at least two anisotropic dielectric layers 5 and 6 with misaligned anisotropy axes, as shown in FIG. 7. The absence of the bulk magnetization can be essential for the homogeneity of magnetic field inside the stack.

Figure 9:
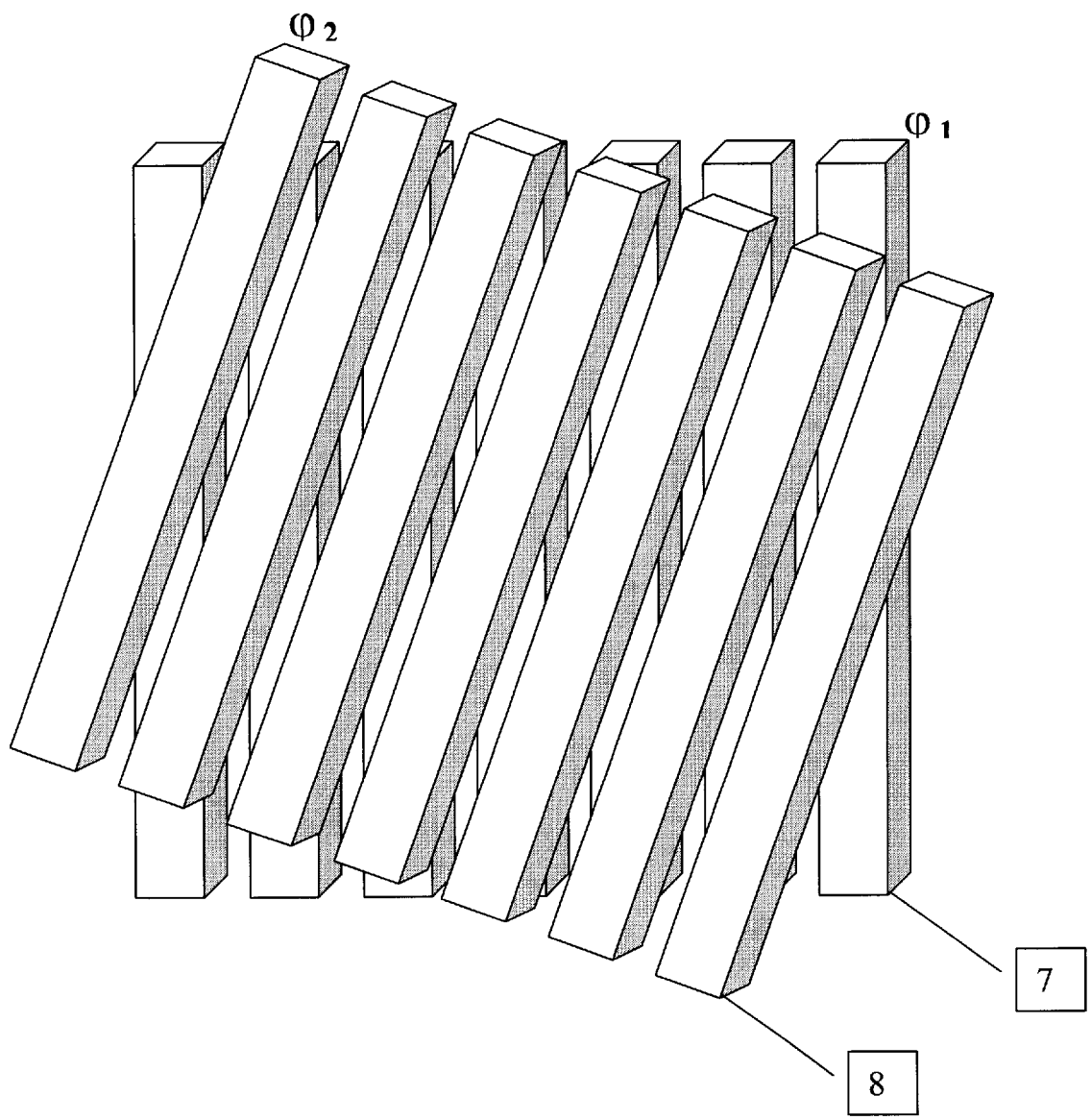
FIG. 9 is a diagrammatic perspective view of another embodiment of the anisotropic layers of FIGS. 5–7 with periodic "woodpile" layers for the respective orientations $\phi_1$ and $\phi_2$ in the X-Y plane. In this case, the spectral asymmetry does not require the dielectric material of the woodpile to be anisotropic.

(6) The subject of the paragraphs (4) and (5) in which the anisotropic dielectric layers are replaced with the woodpile layers as shown in FIG. 9. The dielectric material in such layers does not have to be anisotropic, in order to ensure spectral asymmetry of the entire periodic array.

(7) A unidirectional photonic crystal.

(8) A unidirectional gyrotropic photonic crystal, which is the subject of paragraph (7) incorporating a gyrotropic constituent. Examples are presented in FIGS. 5 and 7.

Figure 12A:
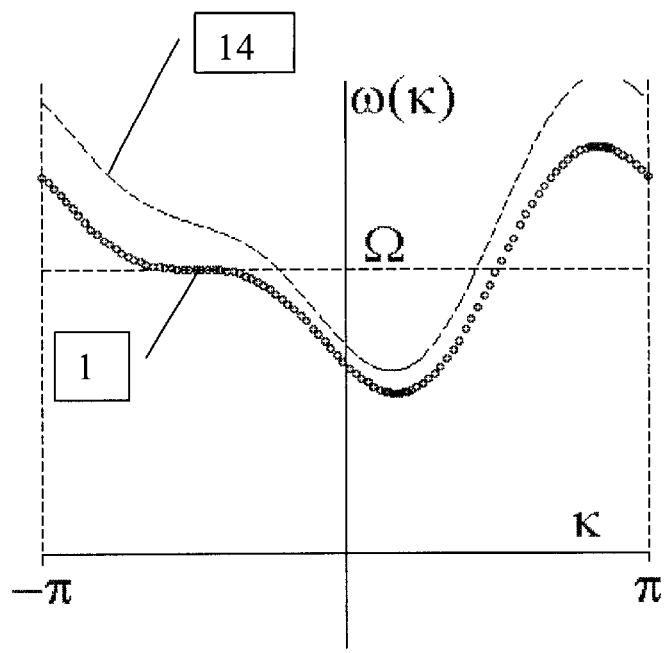
FIGS. 12A and 12B are graphs of an asymmetric spectral branch which is modified when: (i) the wave vector k deviates from the direction Z of unidirectionality and/or (ii) some the physical parameters of unidirectional photonic crystal (e.g., direction or magnitude of applied magnetic field, structural geometry, etc.) are modified. In either case the property of unidirectionality disappears. A combined effect of at least two of the above reasons can preserve the unidirectionality and result in: (i) a shift of the frequency Ω of the frozen mode and/or (ii) a change of the direction Z of the unidirectionality.
Figure 12B:
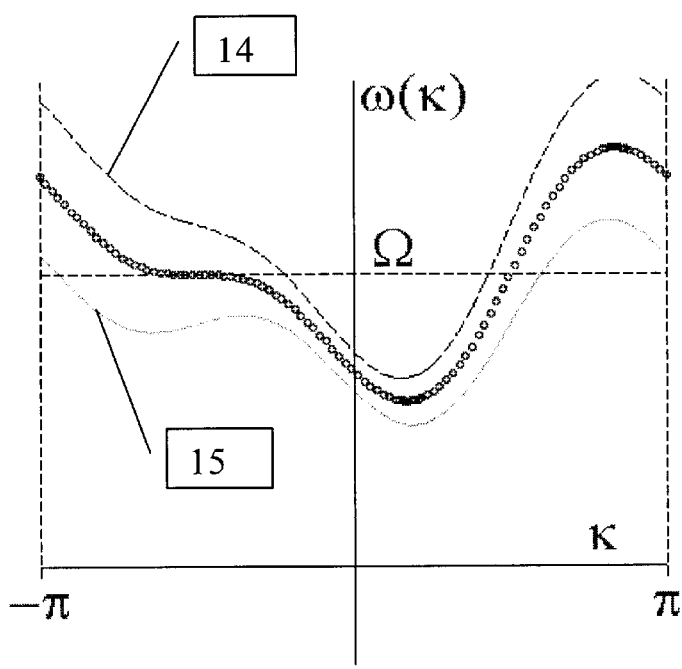

(9) A tunable unidirectional photonic crystal, which is a tunable version of the subject of paragraph (7). The tunability can be achieved by changing an applied magnetic field, altering the geometry of the periodic array, or by other external causes. The tunability, in particular, can be used (i) to change the direction Z of unidirectionality; (ii) to shift the frequency $\Omega$ of the frozen mode; (iii) in the cases of magnetically soft ferrite constituent, to switch the direction of transmittance for the opposite (i.e., switch +Z for −Z) by changing for the opposite the direction of steady magnetic field H ∥Z; (iv) to eliminate or to blur the property of unidirectionality, as shown in FIG. 12.

Figure 10:
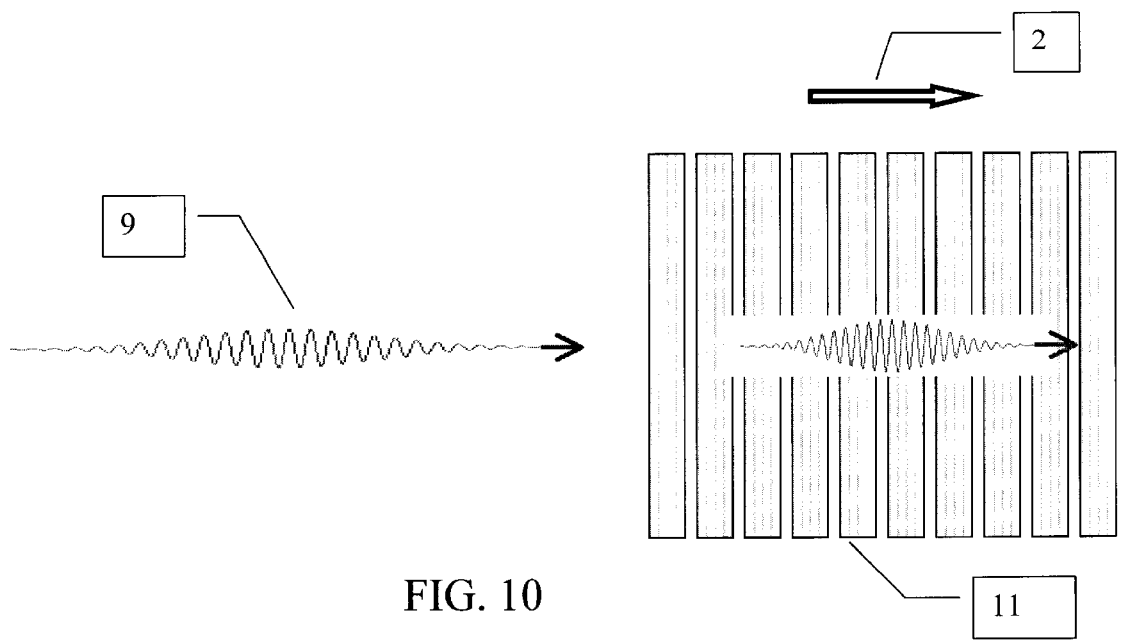
FIGS. 10 and 11 are diagrammatic side cross-sectional views of a thick unidirectional photonic slab. The wave packets with a frequency close to that of the frozen mode impinge on the unidirectional photonic slab from two opposite directions along the Z axis. In the case of FIG. 10, the impinging wave 9 produces the propagating Bloch wave with finite group velocity inside the slab, But in the case of FIG. 11, the impinging wave 10 produces the frozen or nearly frozen mode, which has negligible group velocity, the wave packet slows down dramatically after entering the slab, while its amplitude increases sharply.
Figure 11:
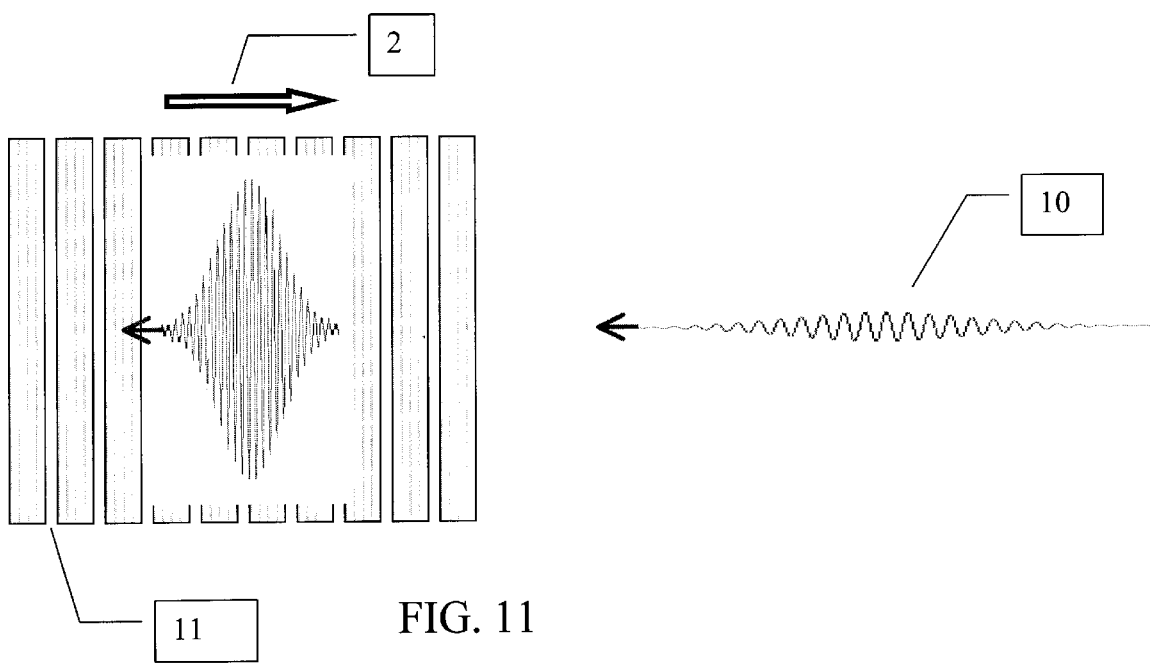

(10) A unidirectional slab 11 in FIGS. 10 and 11, which is a piece of the unidirectional photonic crystal of paragraph (7), (8) or (9) bounded by two plane faces. The faces are assumed to be perpendicular to the Z-direction associated with the frozen mode, unless otherwise is specifically qualified. The wave packet 9 in FIG. 10 of the frequency and normal incidence impinging on the left face of the slab 11 will be transmitted through the slab with the speed, comparable with the speed of light. By contrast, the wave packet 10 in FIG. 11 of the same frequency $\Omega$ and the opposite direction of propagation impinging on the opposite face of the slab 11 will be either trapped inside the slab where it can be utilized, or drastically slowed down. The device in FIGS. 10 and 11 may or may not be tunable. The tunability feature, if present, is explained in paragraph (9).

(11) The unidirectional slab of paragraph (10) in which the direction Z of unidirectionality may not be perpendicular to the slab faces. The device may or may not be tunable. If the tunability feature allows for controllable alteration of the Z-direction, this device is a tunable version of the one of paragraph (10).

Figure 13:
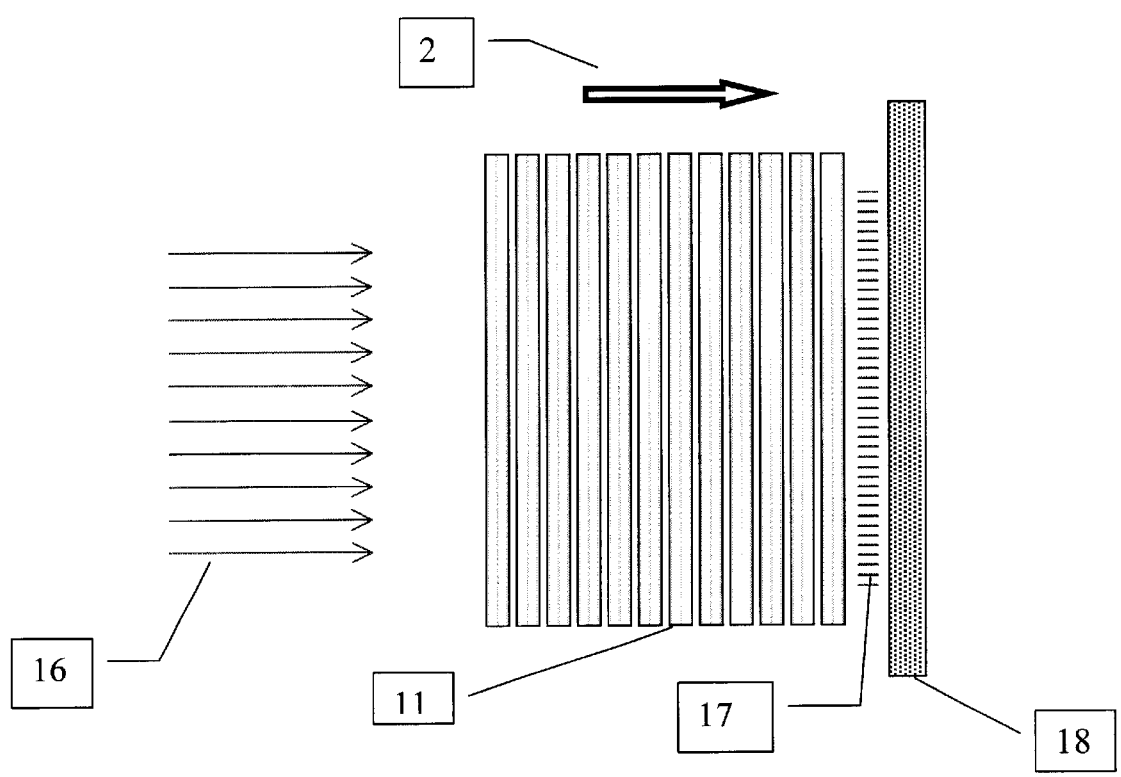
FIG. 13 is a diagrammatic side cross-sectional depiction of the apparatus incorporating the unidirectional slab 11 and the plane mirror 18. The reflective (left) face of the mirror 18 is parallel to the slab faces. The gap 17 between the mirror and the nearest face of the slab, if exists, may contain some microwave devices (e.g., an antenna, a phase sensitive antenna array, etc.), as shown in FIG. 15. The gap 17 can also be filled or partially filled with some dielectric substance. The arrow 2 shows the direction of transmittance (the opposite direction corresponds to the frozen mode) shows the incident radiation with the frequency equal or close to Ω.
Figure 14:
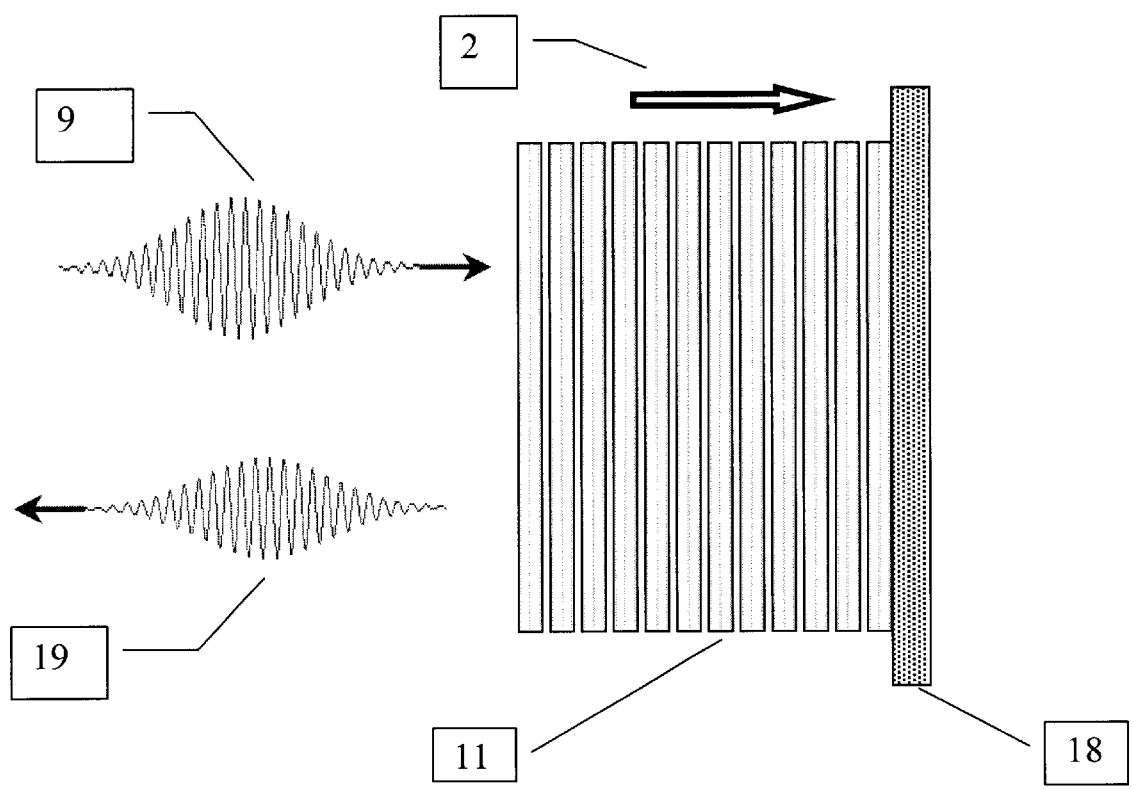
FIG. 14 is a diagrammatic side cross-sectional view of the device in FIG. 13, used as a retardation plate. In this case, there is no gap between the mirror and the slab. The frequency associated with the incoming wave packet 9, as well as the outgoing wave packet 19 is close to Ω. The direction of propagation is close to the direction Z of unidirectionality. The retardation is gained after the wave packet being reflected form the mirror 18 and converted into the slow frozen mode.

(12) A device comprising the unidirectional slab 11 of paragraph (10) and the plane mirror 18, as shown in FIG. 13. The gap 17 between the mirror 18 and the nearest face of the slab 11 may vary depending on the application, it may also be absent, as shown in FIG. 14. The slab faces and the mirror are parallel to each other. The mirror is assumed to be sufficiently reflective in the frequency range of interest, including the vicinity of the frequency $\Omega$ of the frozen mode. The utility of this device is described in paragraphs (14) through (23).

(13) The device of paragraph (12) in which the direction Z of unidirectionality is not perpendicular to the slab faces.

(14) The device of paragraph (12) without a gap between the mirror and the slab face, used as a wave packet delay line (retardation plate), as explained in FIG. 14. The delay line may or may not be tunable. The delay time τ is maximal in the case of the normal incidence of the incoming wave packet and the frequency $\Omega$ close to the frequency $\Omega$ of the frozen mode. The paragraphed device has the following functional features: (i) the delay time τ controllably alterable within wide limits; (ii) low dispersion $\partial\Omega/\partial\omega$, due to the fact that $\partial u/\partial\omega=0$ at $\omega=\Omega$; (iii) the possibility for impedance matching.

(15) The device of paragraph (13) without a gap between the mirror and the slab face, used as a wave packet delay line. This apparatus is similar to that of paragraph (14) but the direction Z of unidirectionality is now slanted. The delay time τ of the device is sensitive to the frequency and the direction of propagation of the incident radiation τ is maximal if the frequency ω is close to $\Omega$, and the direction of propagation of the incident wave is chosen so that the backward wave, after being reflected from the mirror, propagates through the slab along or close to the (slanted) Z direction with extremely low group velocity. If the tunability feature allows for controllable alteration of the Z-direction, this device is a tunable version of the one of paragraph (14).

(16) The device of paragraph (12) used as a single mode resonator with directional sensitivity. The single resonance mode of the device is the frozen mode. Since the frozen mode has zero group velocity, the energy will be efficiently held inside the resonator and/or utilized there. The energy influx is provided by the incoming radiation 16 of frequency $\Omega$ and normal incidence that can freely enter the resonator (the unidirectional slab 11), but cannot escape back from it. In the case of oblique incidence and/or if the frequency ω is different from $\Omega$, the backward wave, after being reflected from the mirror, has a finite group velocity and escapes the slab 11. Therefore, the device in FIG. 13 only accumulates the energy of incoming wave with ω=$\Omega$ and normal incidence, which means the directional and frequency selectivity. The device may or may not be tunable. The device can be used in combination with other devices utilizing the accumulated energy.

(17) The device of paragraph (15) used as a single mode resonator with directional sensitivity. This apparatus is similar to that of paragraph (16) but the direction Z of unidirectionality is now slanted. The device may or may not be tunable. If the tunability feature allows for controllable alteration of the direction Z, this device is a tunable version of the one of paragraph (16).

Figure 15:
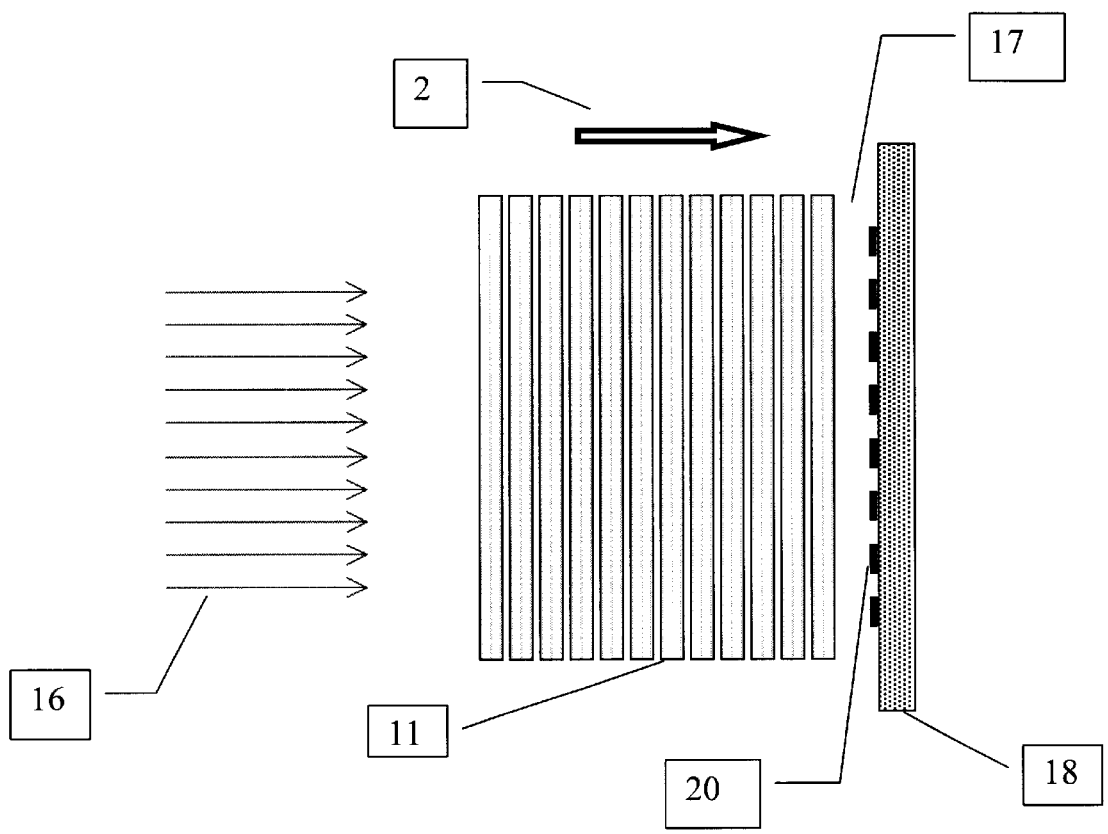
FIG. 15 is a diagrammatic side cross-sectional view of the apparatus in FIG. 13 with a receiving device 20 placed in the gap 17. The receiving device 20 may represent an individual antenna, a phase sensitive antenna array, any other devices processing or utilizing the incoming electromagnetic radiation. The size of the gap 17 may vary depending on specific application. In particular, the gap may form an electromagnetic resonator (at the frequency close to Ω), or it may be absent at all. The novel feature of the apparatus in FIG. 15 is the presence of the unidirectional slab 11. The unidirectional slab 11 confines the electromagnetic energy in the vicinity of the gap 17 and prevents the radiation reflected from the mirror 18 and the receiving device 20 from escaping the system. The presence of the unidirectional slab 11 will: (i) drastically enhance the efficiency of the receiving device preventing the radiation from being reflected back in space, (ii) enhance the directional selectivity of the receiving device, because the wave with oblique incidence will escape the system after being reflected by the mirror, (iii) enhance frequency selectivity of the receiving device. The overall apparatus in FIGS. 13 and 15 can be tunable, as soon as the unidirectional slab 11 is a tunable photonic crystal. The tunability features can include the possibility of controlling: (i) the direction of the enhanced reception, (ii) the frequency Ω of the enhanced reception, (iii) the degree of directional and frequency selectivity.

(18) The device of paragraph (12) in which the vicinity of the gap 17 between the mirror and the slab is used for accumulation and processing of the electromagnetic radiation as explained in FIGS. 13 and 15. The incoming wave 16 of the frequency close to $\Omega$ and normal incidence cannot escape from the vicinity of the gap 17 or the rightmost portion of the slab, and stays there until processed or otherwise utilized. The effect of accumulation only occurs at normal incidence and frequencies close enough to $\Omega$, that leads to the frequency and directional selectivity of the device. The device may or may not be tunable.

(19) The device of paragraph (13) in which the gap between the mirror and the slab or the narrow portion of the slab adjacent to the mirror are used for accumulation and processing of the electromagnetic radiation. This apparatus is similar to that of paragraph (18), but the direction Z of unidirectionality can now be slanted. The accumulation only occurs at the frequencies close to $\Omega$ and the proper incidence. The propagation direction of the incident wave must be chosen so that the direction of backward wave propagation coincides with the (slanted) direction Z of unidirectionality. The device may or may not be tunable. If the tunability feature allows for controllable alteration of the Z-direction, this device is a tunable version of the one of paragraph (18).

(20) The device of paragraph (18) in which the distance A between the mirror 18 and the slab face is a multiple of $\lambda/2$, where $\lambda$ is the radiation wavelength within the gap. In this case the space 17 between the slab and the mirror forms an electromagnetic resonator with the single eigenfrequency $\Omega$. The incoming wave with normal incidence and $\omega=\Omega$ enters the resonator, but cannot escape from there. In the case of oblique incidence and/or if the frequency $\omega$ is different from $\Omega$, the electromagnetic radiation, after being reflected from the mirror, reenters the slab and having a finite group velocity, escapes the device through the slab. The introduced device can be used as a single mode resonator with enhanced frequency and directional selectivity of the device described in (18). The device may or may not be tunable.

(21) The device of paragraph (20) with slanted direction Z of unidirectionality. The device may or may not be tunable. If the tunability feature allows for controllable alteration of the Z-direction, this device is a tunable version of the one of paragraph (20).

(22) The device which comprises the device of paragraph (12) or its particular realizations (18) or (20) and receiving device (devices) 20 placed in the gap 17. The receiving device 20 may represent an individual antenna, a phase sensitive antenna array, any other devices processing or utilizing the incoming electromagnetic radiation. Compared to the previous art comprising the (dielectric) mirror 18 and the phase sensitive antenna array 20, adding the unidirectional slab 11 drastically enhances the effectiveness, as well as the directional selectivity of the receiving device, as explained in FIG. 15.

(23) The apparatus of paragraph (22) with the tunability feature. This allows to control: (i) the selected direction of the incoming radiation for which the electromagnetic energy gets trapped in the vicinity of the mirror; (ii) the frequency $\Omega$; (iii) the level of directional and frequency sensitivity.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following paragraphs. For example, notwithstanding the fact that the elements of a paragraph are set forth below in a certain combination, it must be expressly understood that the invention includes other combinations of fewer, more or different elements, which are disclosed in above even when not initially paragraphed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a paragraph must be understood as being generic to all possible meanings supported by the specification and by the word itself.

The definitions of the words or elements of the following paragraphs are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the paragraphs below or that a single element may be substituted for two or more elements in a paragraph. Although elements may be described above as acting in certain combinations and even initially paragraphed as such, it is to be expressly understood that one or more elements from a paragraphed combination can in some cases be excised from the combination and that the paragraphed combination may be directed to a subcombination or variation of a subcombination.

Insubstantial changes from the paragraphed subject matter as viewed by a person with ordinary skill in the art, now known or later devised, are expressly contemplated as being equivalently within the scope of the paragraphs. Therefore, obvious substitutions now or later known to one with ordinary skill in the art are defined to be within the scope of the defined elements.

The paragraphs are thus to be understood to include what is specifically illustrated and described above, what is conceptionally equivalent, what can be obviously substituted and also what essentially incorporates the essential idea of the invention.

We claim:

1. A photonic crystal with bulk spectral asymmetry comprising a plurality of at least two homogeneous constitutive components forming a periodic array, which homogeneous constitutive components are substantially lossless at an electromagnetic frequency of interest, at least one of the two homogeneous constitutive components having a spontaneous magnetic order and/or an induced magnetic order from an applied external magnetic field, the periodic array having a composition and geometry so that the array displays strong bulk spectral asymmetry and, at least at one particular frequency $\Omega$, it displays electromagnetic unidirectionality.

2. The photonic crystal of claim 1 further comprising additional substantially lossless constitutive components.

3. The photonic crystal of claim 2 where the additional substantially lossless constitutive components are not homogeneous.

4. The photonic crystal of claim 3 where the additional substantially lossless constitutive components comprise microwave resonators.

5. The photonic crystal of claim 3 the additional substantially lossless constitutive components comprise at least one microwave circuit.

6. The photonic crystal of claim 1 further comprising means for providing tunability controlled by an external magnetic or electric field.

7. The photonic crystal of claim 1 further comprising means for providing tunability controlled by altering geometric characteristics of the photonic crystal.

8. The photonic crystal of claim 1 further comprising means for providing tunability controlled by an external physical cause other than an external dc magnetic or electric field.

9. The unidirectional photonic crystal of claim 1 comprised of an array of primitive fragments, where each primitive fragment comprises at least one gyrotropic layer and at least two anisotropic dielectric layers with misaligned anisotropic axes.

10. The unidirectional photonic crystal of claim 1 having zero averaged magnetization and comprised of an array of primitive fragments, and where each primitive fragment comprises at least two gyrotropic layers with opposite magnetization and at least two anisotropic dielectric layers with misaligned anisotropic axes.

11. A photonic crystal comprising a plurality of at least two homogeneous constitutive components forming a periodic array, which homogeneous constitutive components are substantially lossless at an electromagnetic frequency of interest, at least one of the two homogeneous constitutive components being a ferromagnet or a ferrite, so that the array is electromagnetic unidirectional for at least one particular frequency and at least one particular direction of propagation.

12. The photonic crystal of claim 11 further comprising means for tuning the crystal.

13. The photonic crystal of claim 12 where the means for tuning the crystal comprises means for tuning the crystal by changing an external, applied magnetic or electric field.

14. The photonic crystal of claim 12 where the means for tuning the crystal comprises means for altering the geometry of the periodic array.

15. The photonic crystal of claim 12 where the means for tuning the crystal comprises means for tuning the crystal by an external cause other than external dc magnetic or electric field.

16. The photonic crystal of claim 12 where the means for tuning the crystal comprises means to change the direction Z of unidirectionality.

17. The photonic crystal of claim 12 where the means for tuning the crystal comprises means to shift the frequency $\Omega$ of the frozen mode.

18. The photonic crystal of claim 12 where the magnetic constitutive component is a magnetically soft ferromagnet or ferrite and where the means for tuning the crystal comprises means to switch the direction of unidirectionality to the opposite by changing to the direction of a steady external magnetic field, H, parallel to Z.

19. The photonic crystal of claim 12 where the means for tuning the crystal comprises means to blur or to eliminate a stationary inflection point and thereby to eliminate the property of unidirectionality.

20. An unidirectional slab device with frequency and directional selectivity comprised of an unidirectional photonic crystal bounded by two plane faces, each of which is perpendicular to a Z-direction associated with a frozen mode frequency $\Omega$, such that a first wave packet of frequency $\Omega$ and normal incidence impinging on one plane face is transmitted through the photonic crystal, while a second wave packet of the same frequency $\Omega$ and in the opposite direction of propagation impinging on the opposite face is trapped inside the slab device where it accumulates or is processed.

21. The unidirectional slab device of claim 20 further comprising means for tuning the crystal.

22. The unidirectional slab device of claim 20 wherein the direction Z of unidirectionality is not perpendicular to the faces.

23. The unidirectional slab device of claim 21 where the means for tuning the crystal comprises means to change the direction Z of unidirectionality.

24. The unidirectional slab device of claim 20 further comprising a plane mirror and a gap being defined between the mirror and the nearest face of the unidirectional photonic crystal, the faces of the unidirectional photonic crystal and the mirror being parallel to each other, the mirror being to be sufficiently reflective in a frequency range of interest which includes frequencies in the vicinity of the frozen mode frequency $\Omega$.

25. The unidirectional slab device of claim 24 where the direction Z of unidirectionality is not perpendicular to the faces of the unidirectional photonic crystal.

26. The unidirectional slab device of claim 24 where the gap between the mirror and the face has a size of zero and where the unidirectional device is used as a wave packet delay line having a delay time $\tau$, the delay time $\tau$ is maximal when incoming radiation has normal incidence and a frequency close to the frozen mode frequency $\Omega$.

27. The unidirectional slab device of claim 26 where the delay line further comprises means for tuning the unidirectional photonic crystal.

28. The unidirectional slab device of claim 24 where the direction Z of unidirectionality is not perpendicular to the faces of the unidirectional photonic crystal, and where $\tau$ is maximal if the direction of propagation of the incident first wave packet is chosen so that the backward radiation, after being reflected from the mirror, propagates through the unidirectional photonic crystal along or close to the slanted Z direction with lowest group velocity.

29. The unidirectional slab device of claim 28 further comprising means for tuning the crystal.

30. The unidirectional slab device of claim 22 characterized as a single mode resonator with directional sensitivity comprised of an unidirectional photonic slab and a plane mirror disposed on one of the two plane faces of the slab, where a single resonance mode of the resonator is the frozen mode of frequency $\Omega$, which has substantially zero group velocity so that energy will be efficiently retained within the resonator in which energy influx is provided by incoming radiation of frequency $\Omega$ at normal incidence so that the radiation can freely enter the resonator, but cannot escape from it, in the case of oblique incidence and/or if the frequency $\omega$ is different from $\Omega$, a backward wave being reflected from the mirror with a finite group velocity so that the backward radiation escapes the unidirectional photonic crystal, the resonator accumulating the energy of incoming radiation with $\omega=\Omega$ and normal incidence with directional and frequency selectivity.

31. The single mode resonator of claim 30 further comprising means for tuning the crystal.

32. The single mode resonator of claim 30 further comprising other devices utilizing the accumulated energy.

33. The single mode resonator of claim 30 where the direction Z of unidirectionality is not perpendicular to the faces of the unidirectional photonic crystal.

34. The single mode resonator of claim 33 further comprising means for tuning the crystal.

35. The unidirectional device of claim 22 further comprising receiving means disposed in the gap between the mirror and the unidirectional photonic crystal for processing or utilizing of the electromagnetic radiation accumulated at the gap or adjacent portion of the unidirectional slab.

36. The single mode resonator of claim 35 further comprising means for tuning the crystal.

37. The unidirectional device of claim 35 where the direction Z of unidirectionality is not perpendicular to the faces of the unidirectional photonic crystal.

38. The single mode resonator of claim 30 further comprising the gap being defined between the mirror and the nearest face of the unidirectional photonic crystal has a size, $\Delta$, which is the distance between the mirror and one of the faces of the unidirectional photonic crystal, the size, $\Delta$, being a multiple of $\lambda/2$, where $\lambda$ is the radiation wavelength within the gap, the gap between the unidirectional photonic crystal and the mirror forming an electromagnetic resonator with the single eigenfrequency, $\Omega$, where an incoming wave with normal incidence and frequency $\Omega$ entering the resonator cannot escape therefrom, while an incoming wave with oblique incidence or frequency $\omega$ different from $\Omega$ being reflected from the mirror, reentering the unidirectional photonic crystal and having a finite group velocity escapes the device.

39. The single mode resonator of claim 38 further comprising means for tuning the crystal.

40. The single mode resonator of claim 30 further comprising a gap being defined between the mirror and the nearest face of the unidirectional photonic crystal, the gap having a size, $\Delta$, which is the distance between the mirror and one of the faces of the unidirectional photonic crystal, the size, $\Delta$, being a multiple of $\lambda/2$, where $\lambda$ is the radiation wavelength within the gap, the gap between the unidirectional photonic crystal and the mirror forming an electromagnetic resonator with the single eigenfrequency, $\Omega$, where an incoming wave perpendicular to the face of the unidirectional photonic crystal and having the frequency $\Omega$ entering the resonator cannot escape therefrom, while an incoming wave with oblique incidence or frequency $\omega$ different from $\Omega$ being reflected from the mirror, reentering the unidirectional photonic crystal and having a finite group velocity escapes the device.

41. The single mode resonator of claim 40 further comprising means for tuning the crystal.

42. The unidirectional device of claim 35 where the receiving device comprises an individual antenna, a phase sensitive antenna array, or other means for processing or utilizing electromagnetic radiation.

43. The unidirectional device of claim 42 further comprising means for tuning the unidirectional device to control: (i) the selected direction of the incoming radiation for which the electromagnetic energy gets trapped in the vicinity of the mirror; (ii) the selected frequency $\Omega$; or (iii) the level of directional and frequency sensitivity of the unidirectional device.

* * * * *